US012682092B2

(12) United States Patent
Davis

(10) Patent No.: US 12,682,092 B2
(45) Date of Patent: Jul. 14, 2026

(54) SYSTEMS AND METHODS FOR USER DATA COLLECTION

(71) Applicant: ConocoPhillips Company, Houston, TX (US)

(72) Inventor: Clinton A. Davis, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 184 days.

(21) Appl. No.: 17/983,006

(22) Filed: Nov. 8, 2022

(65) Prior Publication Data

US 2023/0148248 A1 May 11, 2023

Related U.S. Application Data

(60) Provisional application No. 63/276,802, filed on Nov. 8, 2021.

(51) Int. Cl.
*G06F 21/62* (2013.01)
*H04L 9/40* (2022.01)

(52) U.S. Cl.
CPC .......... *G06F 21/6218* (2013.01); *H04L 63/08* (2013.01); *H04L 63/105* (2013.01)

(58) Field of Classification Search
CPC .................................................. G06F 21/6218
See application file for complete search history.

(56) References Cited

U.S. PATENT DOCUMENTS 9,830,563 B2 11/2017 Paknad
2007/0271517 A1 11/2007 Finkelman et al.

2011/0093471 A1 4/2011 Brockway et al.
2014/0012767 A1* 1/2014 Schmidt ................. G06Q 50/18
705/311
2017/0142076 A1* 5/2017 Ford ...................... H04L 63/083
2020/0401572 A1* 12/2020 Mutha .................... G06Q 50/18

OTHER PUBLICATIONS

The International Search Report and The Written Opinion Of The International Searching Authority for International Application No. PCT/US2022/049234 dated Feb. 16, 2023 (9 pages).
Extended European Search Report for Application No. 22890909.9 dated Sep. 2, 2025 (10 pages).

* cited by examiner

*Primary Examiner* — Nicholas P Celani
(74) *Attorney, Agent, or Firm* — Polsinelli PC

(57) ABSTRACT

Implementations described and claimed herein provide systems and methods for a data management tool for accessing various databases and data sources to collect or obtain data associated with a user of the tool or a member of an organization. The data management tool may include a user interface for receiving information or inputs from a user, such as a custodian of the data, to determine the various databases and/or systems from which user data may be available. To access the user data, the data management tool may communicate with various sources or gateways to sources, such as cloud-based data storage systems, operating system gateway programs, user hardware gateway programs, and the like. Various databases storing user data may be accessible through the systems or gateways and the data management tool may request such data in response to one or more instructions received via the user interface.

17 Claims, 6 Drawing Sheets

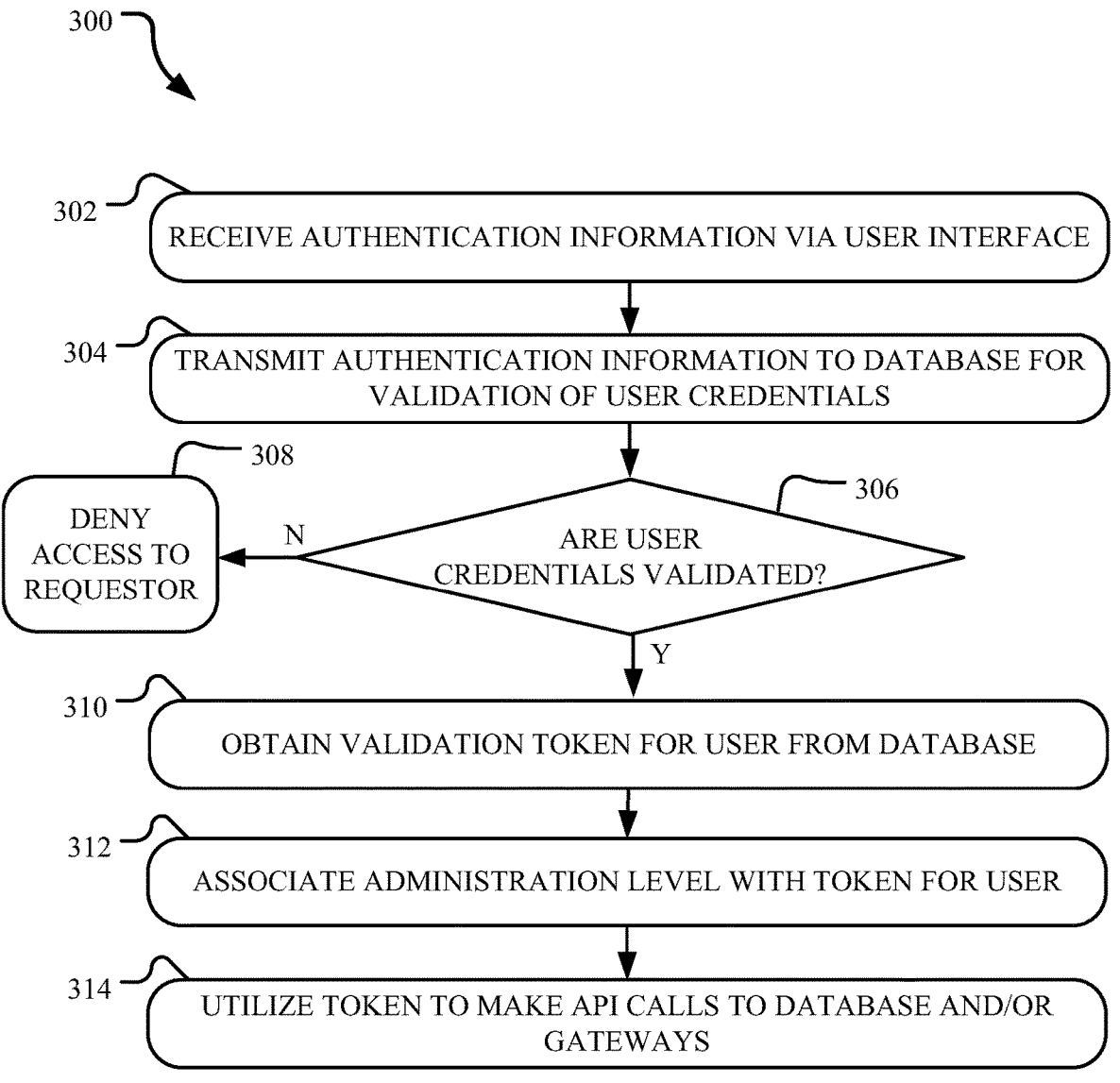

300

302 — RECEIVE AUTHENTICATION INFORMATION VIA USER INTERFACE

304 — TRANSMIT AUTHENTICATION INFORMATION TO DATABASE FOR VALIDATION OF USER CREDENTIALS

308 — DENY ACCESS TO REQUESTOR

N

306 — ARE USER CREDENTIALS VALIDATED?

Y

310 — OBTAIN VALIDATION TOKEN FOR USER FROM DATABASE

312 — ASSOCIATE ADMINISTRATION LEVEL WITH TOKEN FOR USER

314 — UTILIZE TOKEN TO MAKE API CALLS TO DATABASE AND/OR GATEWAYS

RECEIVE AND ACKNOWLEDGE LHO

404

GENERATE CUSTODIAN COMMUNICATIONS FROM TEMPLATE

406

UTILIZE DATA MANAGEMENT TOOL TO OBTAIN DATABASES ASSOCIATED WITH IDENTIFIED USER

408

SUBMIT DATA COLLECTION REQUEST FOR IDENTIFIED DATA SOURCES

410

COLLECT RELEVANT DATA FROM IDENTIFIED DATA SOURCES

SYSTEMS AND METHODS FOR USER DATA COLLECTION

CROSS-REFERENCE TO RELATED APPLICATIONS

The present application claims priority to U.S. Provisional Patent Application No. 63/276,802 filed on Nov. 8, 2021, which is incorporated by reference in its entirety herein.

FIELD

Aspects of the present disclosure relate generally to systems and methods for user data management and processing and, more particularly, to a tool for collecting data associated with a particular user from various data sources associated with a legal hold order (LHO).

BACKGROUND

Large organizations may be required, for many legal reasons including potential litigations, to preserve potential data evidence associated with departments, customers, and employees of the organizations. Further, such data may be required to be obtained and provided to outside parties in response to a legal hold order (LHO) often associated with a litigation or other legal proceeding. Collecting or otherwise accessing data of member of the organization may be a long and arduous process requiring knowledge of jurisdictional legal requirements, potential databases for storing data, user-specific activities and accessed programs, and multiple procedures to access the different potential databases of information, including involving multiple parties and/or departments. In many cases, an organization will assign a collector, often an employee of a legal department, the task of collecting the relevant data in response to an LHO. The collector will conduct an interview or otherwise communicate with targets of the LHO to determine which databases may store the relevant data associated with the target and then work with various parties to obtain the data. This process may be rife with missed data sources, incomplete data searches, and inefficiencies in the collection of the relevant data.

It is with these observations in mind, among others, that various aspects of the present disclosure were conceived and developed.

SUMMARY

Implementations described and claimed herein address the foregoing problems by providing systems and methods for data collection in response to a hold order. The systems and/or methods may include the operations of receiving an identifier of a user based on information in the hold order, accessing, based on the identifier, a plurality of databases storing data associated with the user, wherein accessing the plurality of databases comprises communicating with, via an application programming interface, an operating system gateway program and a cloud-based data storage system, generating an electronic communication comprising at least an identification of the one of the plurality of databases, and transmitting, to the plurality of databases, a request for the data associated with the user based on a response to the generated electronic communication.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 3 is a flowchart of a method for authentication of a user of a data management tool.

DETAILED DESCRIPTION

Aspects of the present disclosure involve systems and methods for a data management tool for accessing various databases and data sources to collect or obtain data associated with a user of the tool or a member of an organization. In one instance, the user data may be collected in response to a legal hold order (LHO) or other data hold request. The data management tool may include a user interface for receiving information or inputs from a user, such as a custodian of the data, to determine the various databases and/or systems from which user data may be available. To access the user data, the data management tool may communicate with various sources or gateways to sources, such as cloud-based data storage systems, operating system gateway programs, user hardware gateway programs, and the like. Various databases storing user data may be accessible through the systems or gateways and the data management tool may request such data in response to one or more instructions received via the user interface. Communication with the various databases and/or gateways may occur over one or more application programming interfaces such that the data management tool provides one tool for accessing data associated with a user from a variety of data sources that provides a precise approach to identification and collection of potentially relevant information associated with a data retention policy or hold request.

Figure 1:
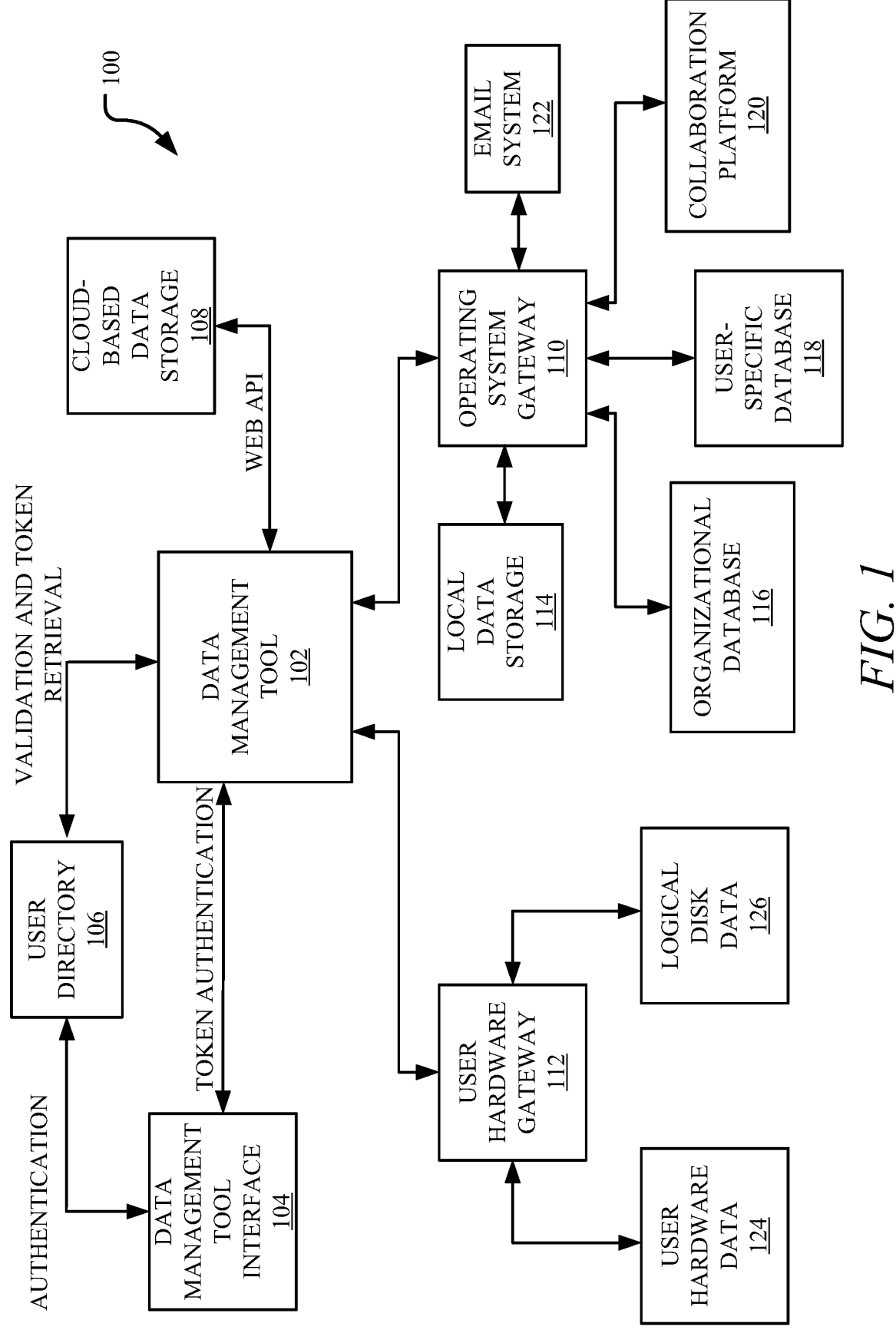
FIG. 1 is a schematic diagram of a data management system that may implement various uses and methods discussed herein.

Beginning with FIG. 1, a data management system 100 is shown. In particular, the data management system 100 may include a data management tool 102 in communication with various data sources and other computing devices. The data management tool 102, in general, may identify and obtain data associated with a user of the system and/or member of an organization associated with the data management system 100 from various data sources. For example, the data management tool 102 may communicate with and obtain data from a cloud-based data storage 106, a user hardware gateway device or application 112, and/or an operating system gateway or application 110. Previously, obtaining such data from the multiple data sources would require accessing each source of data individually to request the relevant data, often leading to data missing from unsearched databases. Through the data management tool 102, relevant data associated with a user or member of an organization can be obtained through one interface, making retrieval of the data more efficient, accurate, and less time consuming.

Figure 2:
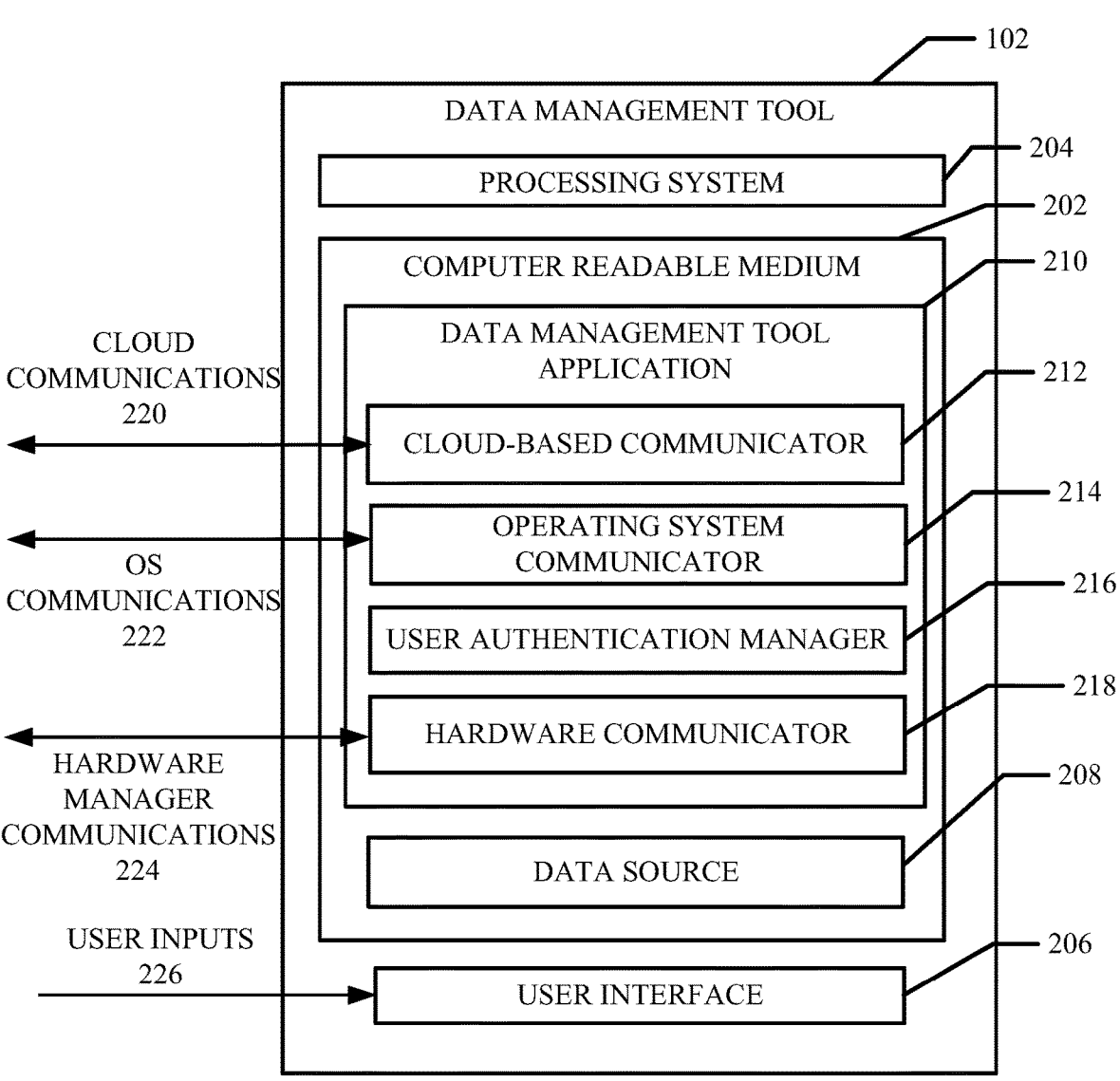
FIG. 2 is a schematic diagram of a data management tool for obtaining user-associated data from a plurality of data sources in response to a legal hold order.

The data management tool 102 is discussed in more detail with reference to the schematic diagram of FIG. 2 illustrating a tool for obtaining user-associated data from a plurality of data sources in response to a LHO or other request for data in accordance with one embodiment. In some instances, a data management tool application 210 may be executed on the data management tool 102 to perform one or more of the operations described herein. The data management tool application 210 may be stored in a computer readable media 202 (e.g., memory) and executed on a processing system 204 of the data management tool 102 or other type of computing system, such as that described below. The computer readable medium 202 includes volatile media, nonvolatile media, removable media, non-removable media, and/or another available medium. By way of example and not limitation, non-transitory computer readable medium 202 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the data management tool 102 may also provide a user interface (e.g., a command line interface (CLI), a graphical user interface (GUI), a mechanical push-button interface etc.) 206 through which a user of the data management tool 102 may provide one or more user inputs 226 to configure or control aspects of the security device. For example, the user inputs 226 may include user identification information used to communicate with the various data sources or a selection of a particular data source from which user information may be retrieved or viewed. In one particular example, a first input value of the user inputs 226 may identify a user of the data management tool 102, such as an administrator or interviewer, and a second input value to identify a particular user or member for which data is requested from the various sources of information.

The data management tool application 210 may also utilize a data source 208 of the computer readable media 202 for storage of data and information associated with the data management tool 102. For example, the data management tool application 210 may store information associated with the one or more users associated with the tool, such as authentication information or tokens, user identification information, application programming interface (API) information, location/address information for various data sources, and the like. In general, any data or information utilized by the data management tool application 210 may be stored and/or retrieved via the data source 208.

The data management tool application 210 may include several components to perform one or more of the operations described herein. For example, the data management tool application 210 may include a cloud-based communicator 212 for communicating with cloud-based databases or other data sources through transmission and/or receipt of cloud communications 220. Using the system 100 of FIG. 1 as an example, the data management tool 102 may communicate with a cloud-based data storage system 108. In one instance, the cloud-based communicator 212 may include an API, such as a web-based API, to communicate with a database hosted in a cloud computing environment. The web-based API of the cloud-based communicator 212 may translate instructions or other communications 220 to and from the cloud-based data storage system 108 such that the communications may be executed by the cloud-based data storage 108 and/or the data management tool 102. The cloud-based data storage 108 may be any data storage embodied or hosted by a remote computing device or devices and accessible by the data management tool 102 through a network or network connection. For example, data stored on the cloud-based data storage 108 may be spread across several storage devices in one or more locations. A cloud computing service may provide such storage devices for the data and space on the devices may be purchased or otherwise obtained by an administrator of the data management tool 102. In some instances, the cloud-based data storage 108 may hosted by a cloud computing environment owned and/or operated by the organization for which employee, member, and/or customer data may be stored on the cloud computing environment. Regardless, the cloud-based communicator 212 may transmit and receive cloud-based communications 220 to access data stored on the cloud-based data storage.

The data management tool 102 may also include an operating system communicator 214 for transmitting and/or receiving operating system communications 222 from an operating system gateway or interface 110. In general, the operating system gateway 110 may provide a programmable model that allows access to a suite of applications or programs that are executed on an operating system. For example, a user's computing device may execute any number of programs through a common operating system, such as Microsoft Windows®. The executed programs may provide various functionality to the users of the computing system or systems. For example, the programs may include an email system 122 for exchanging of emails or other electronic communications. In another example, the programs may provide a collaboration platform 120 for a user to collaborate with other users of an organization, such as through the sharing of messages, drafts of projects, and other project management data. Through the execution of such programs, data specific to users of the programs may be stored in various databases, such as emails stored in an email database, direct messages stored in a collaboration platform database, and the like. The operating system gateway 110 may therefore provide access to the email system 122 and/or the collaboration platform 120 to retrieve or otherwise access the data stored by the systems associated with users or members of the organization. More particularly, the data management tool 102 may communicate with the operating system gateway 110 and request access to the email system 122 and/or the collaboration platform 120 through the gateway. In one instance, the operating system gateway 110 may receive requests for data associated with a user and gather the relevant data from the various programs or sources operating under the operating system. In other instances, the operating system gateway 110 may provide direct access to the various systems or sources such that the data management tool 102 may request user or member data directly from the databases used by the programs. Further, additional programs may also be accessed through the operating system gateway 110, The data management tool 102 may also obtain or otherwise access various databases associated with the operating system through the operating system gateway 110. For example, a local data storage 114 may be present on a computing device of an identified user or member of the organization. Data stored in the local data storage 114 may be accessible by the data management tool 102 through the operating system gateway 110. The local data storage 114 may store local data and information, such as local files, local programs, computing device operational information, etc. Other databases may also be made available to the data management tool 102 through the operating system gateway 110. For example, data and/or information stored in an organizational database 116 may be made accessible to the data management tool 102 via the operating system gateway 110. The organizational database 116 may include organizational-specific data, such as an employee directory for a corporation or business, user identifiers and/or passwords, office locations and directories, corporate hierarchies, department listings, and any other information associated with an organization, such as a business. In a similar manner, user-specific information or data may be obtained from a user-specific database 118 through the operating system gateway 110. User-specific database 118 may store security sensitive information, such as user passwords and/or administrative rights, or any other user-specific information that is not stored locally or in other databases. Other databases may also be made accessible through the operating system gateway 110, including databases containing various retention policies for the organization based on a location of a user or office, various data processing rules or policies based on location, legal rules for accessing data, third party databases (such as social media data including username, passwords, posts, pictures, etc.), and/or any database that utilizes the operating system of the operating system gateway 110 to function.

In a similar manner, the data management tool 102 may include a hardware communicator 218 for communicating or otherwise exchanging hardware manager communications 224 with a user hardware gateway 112 device or system. In general, the user hardware gateway 112 may provide a programmable model that provides access to hardware components used by a user or member of the organization. For example, a user may utilize one or more remote hardware devices for executing a program or service. Such use may generate data that is stored on the hardware components or an associated database of information and/or data. The user hardware gateway 112 may provide an access point for the data management tool 102 to obtain or otherwise utilize the stored user hardware data from the associated database. In a similar manner, a user or member of the organization may execute a program or services that utilizes one or more logical disks 126 for computational or storage reasons. The user hardware gateway 112 may provide an interface for the data management tool 102 to access logical disk use and/or data for a particular user or member of the organization. Although discussed with reference to FIG. 1, it should be appreciated that the data management tool 102 may access additional sources of user data in response to a request data and information, either directly or through a gateway device, system, or program.

Returning to FIG. 2, the data management tool application 210 may also include a user authentication manager 216 to authenticate a user of the data management tool 102. The user authentication manager 216 may execute one or more operations to authenticate a user of the data management tool 102. For example, FIG. 3 illustrates a flowchart of a method 300 for authentication of a user of the data management tool 102. The data management tool 102, and more particularly the user authentication manager 216 of the data management application 210 may execute one or more of the operations of the method 300 of FIG. 3. Such execution may include the use of one or more software programs, one or more hardware components of a computing device, or a combination of both software and hardware components. Further, although described herein as being executed by the data management tool 102, the operations of the method 300 may be performed by any computing device of the system 100 of FIG. 1 or any other computing device, as described below with reference to FIG. 6.

Beginning in operation 302, the data management tool 102 may receive authentication information associated with a potential user of the tool via the user interface 104. In one instance, a potential user of the data management tool 102 may input identification information in the tool interface 104 through one or more input devices to a computing device executing the tool user interface. The identification information may include a username, employee identification number, password, employee location and/or department, or any other information used to identify a user of the data management tool 102. In general, the authentication information of the user may be stored and/or provided by the user directory 106 to the user for use in accessing the data management tool 102. The user directory 106 may therefore be a central repository for user information such that users of the data management tool 102 may register with the user directory 106 prior to access of the tool. As such, the data management tool 102 may transmit the received authentication information to the user directory 106 for validation of the provided information in operation 304.

To validate the authentication information, the user directory 106 may receive the authentication information and compare the received information to the valid user information stored at the user directory. For example, the user directory 106 may compare the received information against a list of valid user names and passwords or any other identifying information. If the authentication information is maintained by the user directory 106, then the information may be validated by the directory. In some instances, the user directory 106 may return a validation indicator to the data management tool 102 if the authentication information is validated or may return an un-validated indicator if the authentication information is not validated. Thus, in operation 306, the data management tool 102 may determine if the user authentication information is validated based on a return received from the user directory 106. If the user authentication information is not validated by the data management tool 102, the tool may deny access to the data management tool for the user.

If the user credentials are validated by the data management tool 102, the tool may obtain a validation token for the user from the user directory 106 in operation 310. In particular, the user directory 106 may maintain a unique validation token for each valid user identified in the database. In response to authenticating a valid user, the user directory 106 may transmit the validation token associated with the user to a requesting device, such as the data management tool 102. The validation token may be a unique value that may or may not be encrypted such that the token is a secure data structure that uniquely identifies the particular user of the data management tool 102. In some instances, the data management tool 102 may provide the authentication token to the user interface 104 for further verification of the user.

In operation 312, the data management tool 102 may associate an administrative level for the user with the received token. For example, the data management tool 102 and/or the user directory 106 may maintain an administrative level for one or more of the users of the data management tool. The administrative level may determine a level of access of data for the authenticated user of the tool. For example, a user may be granted access to their own data from the various data sources in communication with the data management tool 102. Other users may be granted rights to access their own data, as well as other user's data. Such users may be granted permission, via the administrative level associated with the received token, to query other user's data profiles and additional attributes exposed such as the parent folder file listing. In some instances, the administrative level may be used to identify data sources for which information or data may be obtained when it is not feasible or practicable to contact a potential custodian to assist with the identification and collection of data. The data management tool 102 may maintain any number of administrative levels for users of the tool with varying types of access to user data.

In operation 314, the data management tool 102 may utilize the user token to make one or more API calls to the various data sources. For example, operating system gateway 110 and/or user hardware gateway 112 may receive the validation token from the data management tool 102 as a portion of a request to retrieve data from the corresponding databases or systems. Based on the validation token, the gateways 110, 112 (or any other gateway or access point for the data management tool 102) may determine if the user has approved access to the requested data. In general, a verified user of the data management tool 102 may have access to their own data. However, a higher level of administrative access may be required for access of data of other users of the system. In one particular example, an LHO custodian may be granted access to data associated with users or members of the organization other than the custodian. The data management tool 102 may include any number of administrative levels, with each level providing any level of access to user or member information or data, such as access to particular types of data, particular types of databases, particular types of computing devices, particular security levels of data, and the like. The data sources may allow or deny access to some user data based on the administrative level associated with the validation token included in the data request. In this manner, the validation token associated with the user identification information may be utilized to provide access or deny access to specific information in one or more databases or through one or more gateways or interfaces.

Figure 4:
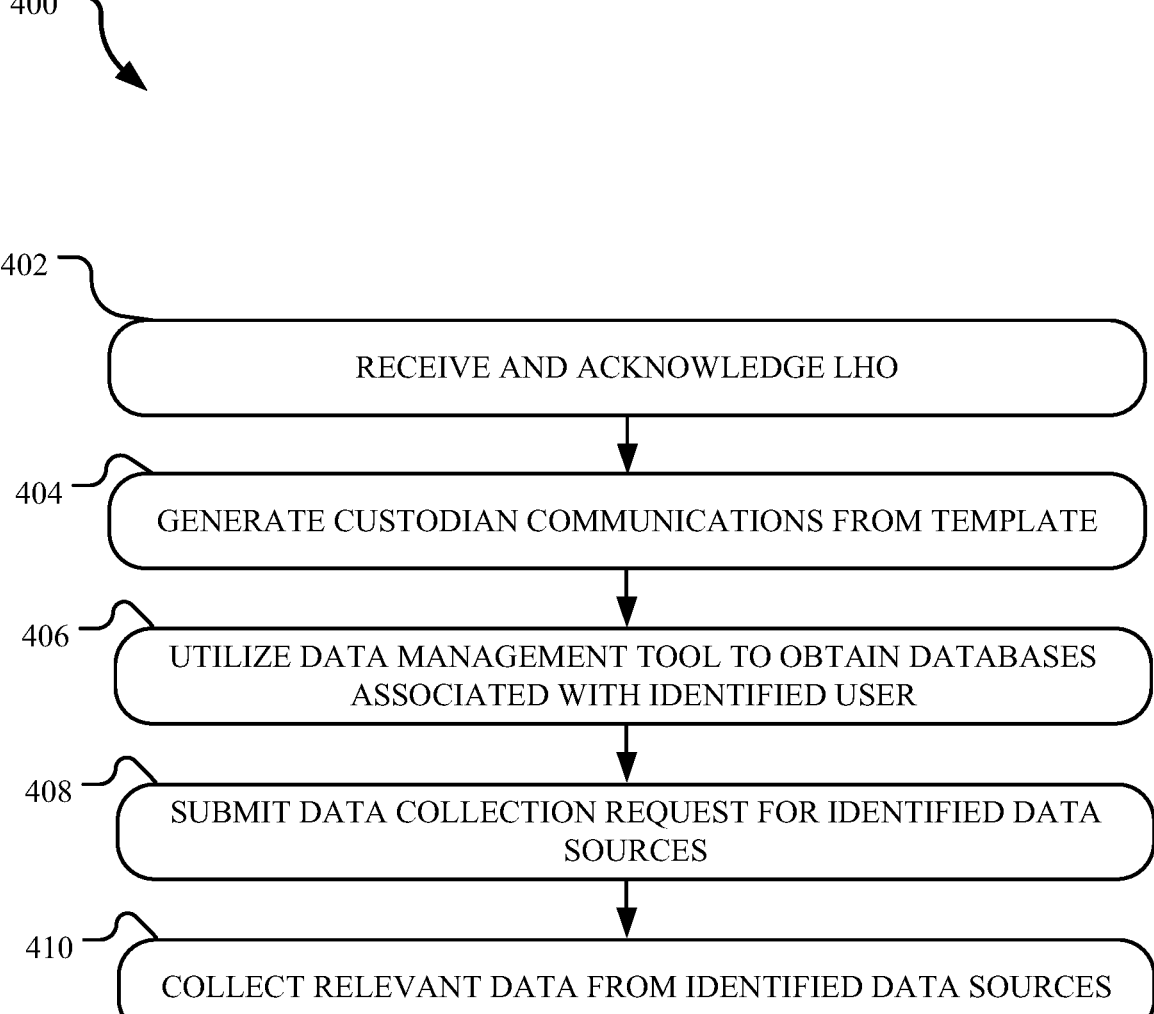
FIG. 4 is a flowchart of a method for utilizing a data management tool for identifying and obtaining data associated with a member of an organization.

In some instances, the data management tool 102 may be used to gather data and/or information in response to an LHO provided to an organization. FIG. 4 is a flowchart of a method 400 for utilizing a data management tool 102 for identifying and obtaining data associated with a member of an organization. The operations of the method 400 may be performed by one or more computing devices, either under control of an operator or independent from an operator, and may include components of the system 100 of FIG. 1, including the data management tool 102. As such, the operations may be executed through one or more software programs, one or more computing hardware components, or a combination of both hardware and software components.

Beginning in operation 402, an LHO or other similar data hold order may be received and acknowledged. The LHO may identify particular users of the data management system 100 or members of an organization for which potentially relevant data may be needed at a future date. The data identified in the LHO may therefore be collected and/or maintained for presentation to a recipient identified in the LHO. In one example, the LHO may be associated with a potential litigation such that the requested data may be provided as potential evidence in the litigation. Regardless of the purpose behind the LHO, the identified information or data may be collected using the data management tool 102. In response to receiving the LHO, a communication for a custodian of at least a portion of the requested data may be generated from a template of custodian communications. For example, the LHO may identify a particular user or member of the organization for which the LHO applies. The data management tool 102 may further refer to the identified party as a custodian of that user's data, although other members may also be referred to as a custodian of the user data, including Information Technology (IT) staff, legal staff or attorneys, supervisors, or any other member of the organization given privilege over user data. The custodian communication generated in operation 404 may be any form of electronic communication, such as an email, a direct message, a text message, a post to a website, and the like. The template for the custodian communication may include portions that are populated with user-specific information. For example, the communication may include a portion in which the identified user's name may be inserted. In general, the template may include a space or portion for any custodian or user-specific information for inclusion in the communication.

In some instances, one or more potential databases or sources may be noted in the custodian communication in which data for the identified user in the LHO may be found. For example, the LHO may request that a particular user maintain or store all emails from or to the user over a specific time period, related to a specific event or project, to or from a particular third party or other member of the organization, and the like. The LHO may also request a similar hold on direct messages or other types of messages in other databases. As such, the data management tool 102 may be utilized to, in operation 406, identify possible data sources for a particular user and the types of data stored by those sources for the user. For example, a custodian identified in the LHO may access the data management tool 102 and provide a particular user identifier, such as an employee identifier, a first and last name, a member number, etc. to the tool. The data management tool 102 may, upon authentication of the custodian and processing of an administrative level of the custodian, access one or more gateways or databases to determine which data sources may store data for the identified user. Using the system 100 of FIG. 1 as an example, the data management tool 102 may access a cloud-based data storage system 108, an operating system gateway 110, and/or a hardware gateway 112 to determine the databases in which the identified user has stored data or information. Additional or fewer databases and/or gateways may be accessed by the data management tool 102 to determine the available data sources. The data management tool 102 may provide the verification token for the custodian to one or more of the databases or gateways to obtain access to the stored user-specific data in response to the received LHO.

Figure 5:
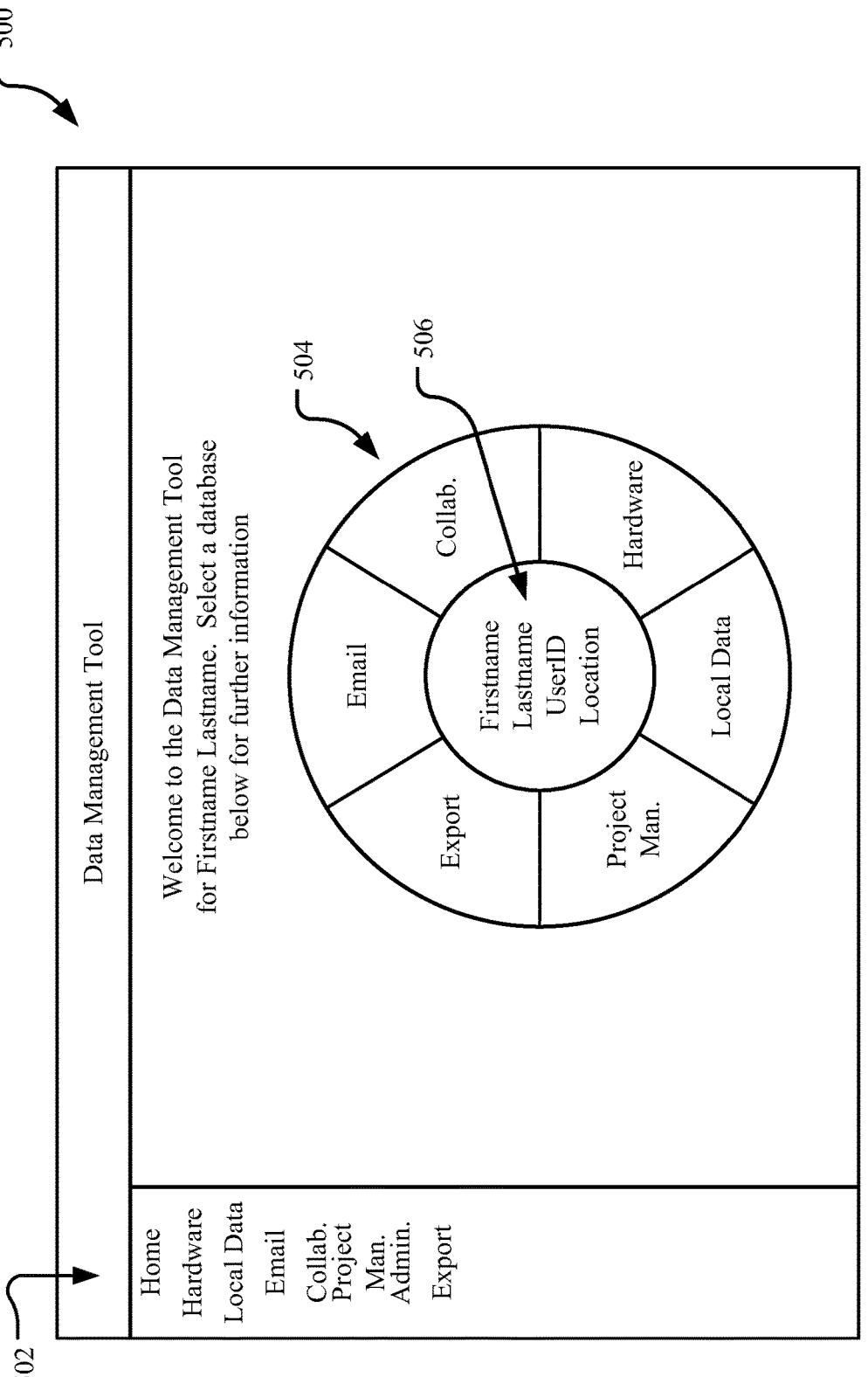
FIG. 5 is an example screenshot of a user interface of a data management tool displaying various sources of user-associated data.

The data management tool 102 may generate a visual graphic in the user interface 104 and displayed on a display device to illustrate the identified databases of user data. For example, FIG. 5 is an example screenshot of a user interface 500 of a data management tool 102 displaying various sources of user-associated data. The screenshot may be generated by the data management tool 102 and generated on a display device of a computing system. In general, the user interface 500 may display information associated with an LHO and data associated with a particular party identified in the LHO. For example, a custodian may provide a user identifier to the data management tool 102 to begin to collect data associated with that user and based on the request included in the LHO. The user interface 500 may include a display wheel 504 in which various information about the identified user and the potential databases in which the user may have stored data is displayed. In this example, the center 506 of the display wheel may display identification information of the user based on the information provided to the data management tool 102 by the custodian. Such information may include a first and last name of the identified user, one or more identifiers of the user (such as a user ID), and a location of the user. This information may be obtained from the user directory 106 or the organizational database 116 discussed above. In addition to the user identification information, the display wheel 504 may also include portions identifying databases storing potentially relevant data for the identified user and/or functionalities of the data management tool 102. For example, the display wheel 504 may include a portion showing an email database, a collaboration database, a hardware database, etc. and an option to export the data obtained by the tool for the identified user. In general, the display wheel 504 may display any information or databases identified by the data management tool 104. One or more of the portions may be selectable via an input device to the display device to access additional information about the database, including the data stored in the identified database associated with the identified user. A site map 502 portion may also be included in the display 500 with selectable links to one or more of the identified databases. In some instances, the particular databases displayed in the user interface 500 may be based on one or more queries transmitted by the data management tool 102 to gateways or data storage systems in communication with the tool.

Returning to FIG. 4 and in operation 408, the data management tool 102 may be utilized to obtain data associated with the identified user from the available databases. For example, the custodian may utilize the data management tool 102 to communicate with the cloud-based storage system 108, the operating system gateway 110, and/or the user hardware gateway 112 to obtain data associated with the identified user. Requests for the user-specific data may be submitted by the data management tool 102 in response to a selection of a particular database from the user interface 500 or may be obtained regardless of a selection of a database. In operation 410, relevant data associated with a cause of the LHO may be gathered. For example, a discovery team of the organization may collect aspects of the data associated with the identified user to respond to a discovery request associated with a litigation. In this manner, the relevant data may be properly managed and provided in response to the LHO in a fast and efficient manner.

The data management tool 102 may include several additional features to make the collection of data of an identified user. For example, the tool 102 may be configured to determine an assigned data location for users or members of the organization. Different jurisdictions may have different laws or procedures for storing and providing user data in response to an LHO or for any other reason. Thus, the data management tool 102 may associate the user or the retrieved data with a particular jurisdiction to comply with local data privacy laws. In general, any jurisdiction rule may be applied to data or users as the data management tool 102 collects user data. Also, the data management tool 102 may allow all users or members of the organization to easily identify data that is not in compliance with the records management policy for the organization. The tool 102 may be used to audit data sources for a user, in some cases with an official attestation conducted yearly or over another time frame. Users may also use the tool 102 to identify particular databases or sources that are relevant to an LHO or other order, reducing the amount of time used for a custodian interview. The identified databases or sources may be tagged by the data management tool 102 based on one or more inputs provided by a user of the tool as relevant to a hold order of some kind.

As mentioned above, the data management tool 102 may also access one or more third party databases, such as social media sites associated with a user or member of the organization. Access to user data may be provided to the data management tool 102 upon a request and included in the collected data for the identified user. In addition, although screen shot 500 is illustrated and discussed herein, it should be appreciated that additional data charts, screen shots, images, graphics, and the like may be generated and displayed in the user interface of the data management tool 102. In some instances, such additional displays may include weights for data size and volume.

Figure 6:
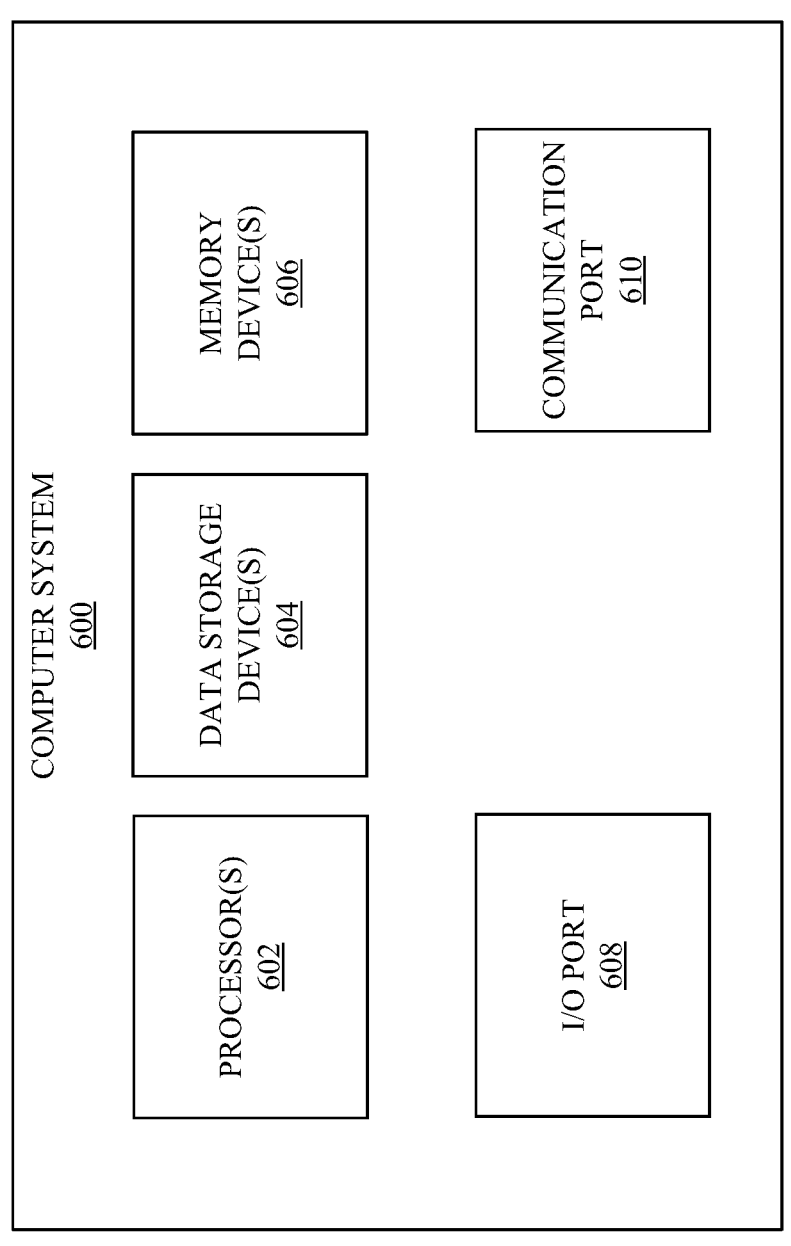
FIG. 6 shows an example computing system that may implement various systems and methods discussed herein.

Referring now to FIG. 6, a detailed description of an example computing system 600 having one or more computing units that may implement various systems and methods discussed herein is provided. The computing system 600 may be applicable to the data management tool 102 of FIG. 1 and other computing or network devices. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 6, including one or more hardware processors 602, one or more data storage devices 604, one or more memory devices 608, and/or one or more ports 608-610. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6.

The processor 602 may include, for example, a central processing unit (CPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device(s) 606, and/or communicated via one or more of the ports 608-610, thereby transforming the computer system 600 in FIG. 6 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608 and a communication port 610, for communicating with other computing, network, or reservoir development devices. It will be appreciated that the ports 608-610 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G) or fourth generation (4G) or fifth generation (5G) network), or over another communication means. Further, the communication port 610 may communicate with an antenna or other link for electromagnetic signal transmission and/or reception.

In an example implementation, waterflood model data, and software and other modules and services may be embodied by instructions stored on the data storage devices 604 and/or the memory devices 606 and executed by the processor 602. The computer system 600 may be integrated with or otherwise form part of the dynamic waterflood modeling system 102.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for validating a user, the method comprising:
receiving authentication information of a first user, the first user is a member of a first organization;
determining a level of access of the first user based on the authentication information;
receiving an identifier of a second user, the identifier including at least one of an employee identifier, a user name, or a member number;
determining, using the identifier, a plurality of cloud-based data storage systems that the second user has access to store data;
generating an instruction to cause a user interface to indicate at least one graphic comprising an identification of the plurality of cloud-based data storage systems that the second user has access to store data;
communicating with, via an application programming interface, an operating system gateway program and the plurality of cloud-based data storage systems;
transmitting, to the plurality of cloud-based data storage systems, an authentication token identifying the level of access of the first user;

accessing the data of the plurality of cloud-based data storage systems based on the authentication token of the first user and the identifier of the second user;
generating an electronic communication comprising at least a user-specific field populated with the identifier of the second user and an identification of the plurality of cloud-based data storage systems that the second user has access to store data;
transmitting the electronic communication to a client device associated with a custodian of at least a portion of the data associated with the second user, the custodian is a member of a second organization that is different from the first organization;
receiving, from the client device, a response that selects at least one cloud-based data storage system from the plurality of cloud-based data storage systems; and
transmitting, to each selected cloud-based data storage systems of the plurality of cloud-based data storage systems, a request for the data.

2. The method of claim 1, wherein communicating with the plurality of cloud-based data storage systems further comprises communicating with a user hardware gateway providing access to a logical disk drive system.

3. The method of claim 1, wherein the operating system gateway program provides access to a plurality of user programs executed utilizing an operating system and a plurality of operating system databases.

4. The method of claim 3, wherein the plurality of user programs comprises an email system, a collaboration platform, and a user calendar program.

5. The method of claim 1, wherein the plurality of cloud-based data storage systems comprises a local storage database, an organizational information database, and a database storing user-specific information.

6. The method of claim 1, further comprising:
displaying a portion of the data associated with the second user stored on the at least one of the plurality of cloud-based data storage systems.

7. One or more tangible non-transitory computer-readable storage media storing computer-executable instructions for performing a computer process on a computing system, the computer process comprising:
receiving authentication information of a first user, the first user is a member of a first organization;
determining a level of access of the first user based on the authentication information;
receiving an identifier of a second user, the-identifier including at least one of an employee identifier, a user name, or a member number;
determining, using the identifier, a plurality of cloud-based data storage systems that the second user has access to store data;
generating an instruction to cause a user interface to indicate at least one graphic comprising an identification of the plurality of cloud-based data storage systems that the second user has access to store data;
receiving an authentication token identifying the level of access of the first user;
accessing the plurality of cloud-based data storage systems using the authentication token of the first user and the identifier of the second user, wherein accessing the plurality of cloud-based data storage systems comprises communicating with, via an application programming interface, an operating system gateway program and the plurality of cloud-based data storage systems;

generating an electronic communication comprising at least a user-specific field populated with the identifier of the second user and an identification of the data of the plurality of cloud-based data storage systems that the second user has access to store data;

transmitting the electronic communication to a client device associated with a custodian of at least a portion of the data associated with the second user, the custodian is a member of a second organization that is different from the first organization;

receiving, from the client device, a response that selects at least one cloud-based data storage system from the plurality of cloud-based data storage systems; and transmitting, to each selected cloud-based data storage systems of the plurality of cloud-based data storage systems, a request for the data.

8. The one or more tangible non-transitory computer-readable storage media of claim 7, wherein accessing the plurality of cloud-based data storage systems further comprises communicating with a user hardware gateway providing access to a logical disk drive system.

9. The one or more tangible non-transitory computer-readable storage media of claim 7, wherein the operating system gateway program provides access to a plurality of user programs executed utilizing an operating system and a plurality of operating system databases.

10. The one or more tangible non-transitory computer-readable storage media of claim 9, wherein the plurality of user programs comprises an email system, a collaboration platform, and a user calendar program.

11. The one or more tangible non-transitory computer-readable storage media of claim 7, wherein the plurality of cloud-based data storage systems comprises a local storage database, an organizational information database, and a database storing user-specific information.

12. The one or more tangible non-transitory computer-readable storage media of claim 7, the computer process further comprising:

rendering a portion of the data associated with the second user stored on the at least one of the plurality of cloud-based data storage systems for display.

13. A system comprising:

a computing device comprising at least one processor, the at least one processor configured to:

receive authentication information of a first user, the first user is a member of a first organization;

determine a level of access of the first user based on the authentication information;

determine, using an identifier of a second user, a plurality of cloud-based data storage systems that the second user has access to store data, the identifier including at least one of an employee identifier, a user name, or a member number;

generate an instruction to cause a user interface to indicate at least one graphic comprising a user-specific field populated with the identifier of the second user and an identification of the plurality of cloud-based data storage systems that the second user has access to store data;

communicate with an operating system gateway program and the plurality of cloud-based data storage systems via an application programming interface;

transmit, to the plurality of cloud-based data storage systems, an authentication token identifying the level of access of the first user;

transmit a request to the plurality of cloud-based data storage systems for data associated with the second user based on a response to an electronic communication by a client device associated with a custodian of at least a portion of the data associated with the second user, the custodian is a member of a second organization that is different from the first organization, the electronic communication comprising at least the authentication token identifying the level of access of the first user and an identification of the plurality of cloud-based data storage systems; and access the data of the plurality of cloud-based data storage systems associated with the second user based on the authentication token of the first user and the identifier of the second user.

14. The system of claim 13, wherein accessing the data of the plurality of cloud-based data storage systems further comprises communicating with a user hardware gateway providing access to a logical disk drive system.

15. The system of claim 13, wherein the operating system gateway program provides access to a plurality of user programs executed utilizing an operating system and a plurality of operating system databases.

16. The system of claim 15, wherein the plurality of user programs comprises an email system, a collaboration platform, and a user calendar program.

17. The system of claim 13, wherein the plurality of cloud-based data storage systems comprises a local storage database, an organizational information database, and a database storing user-specific information.

* * * * *